United States Patent [19]

Tanimura

[11] 4,035,843
[45] July 12, 1977

[54] MAGNETIC RECORDING SYSTEM

[76] Inventor: Hirozo Tanimura, 168, Hishiyanishi, Higashi-Osaka, Osaka, Japan

[21] Appl. No.: 596,076

[22] Filed: July 15, 1975

[30] Foreign Application Priority Data

July 17, 1974 Japan .............................. 49-82359

[51] Int. Cl.² ...................... G11B 5/50; H04M 5/78
[52] U.S. Cl. ................................................ 360/35
[58] Field of Search ................. 360/35, 70, 72, 24; 358/4; 178/6.6 P, 6.6 SF, 6.6 H, 6.6 HS, 6.6 A

[56] References Cited

U.S. PATENT DOCUMENTS

| | | | |
|---|---|---|---|
| 3,397,283 | 8/1968 | Stosberg et al. | 360/35 |
| 3,715,481 | 2/1973 | Harr | 360/35 |
| Re. 28,231 | 11/1974 | Stosberg et al. | 360/35 |

Primary Examiner—Donald J. Yusko
Attorney, Agent, or Firm—Stevens, Davis, Miller & Mosher

[57] ABSTRACT

A magnetic recording system comprising a rotary magnetic head drum assembly including a plurality of rotary magnetic heads, a magnetic tape drive means for intermittently feeding a predetermined length of a magnetic tape passed around said rotary magnetic head drum assembly in a predetermined direction, and means for controlling said magnetic tape drive means according to a signal reproduced from said rotary magnetic head drum assembly.

A video signal to be recorded is recorded by one of the rotary magnetic heads on the magnetic tape in the lengthwise direction of the tape for a predetermined unit period (for instance corresponding to one field) while the tape is held still. After recording, the tape is fed by a predetermined length in the predetermined direction by the magnetic tape drive means so as to be ready for the next recording.

9 Claims, 14 Drawing Figures

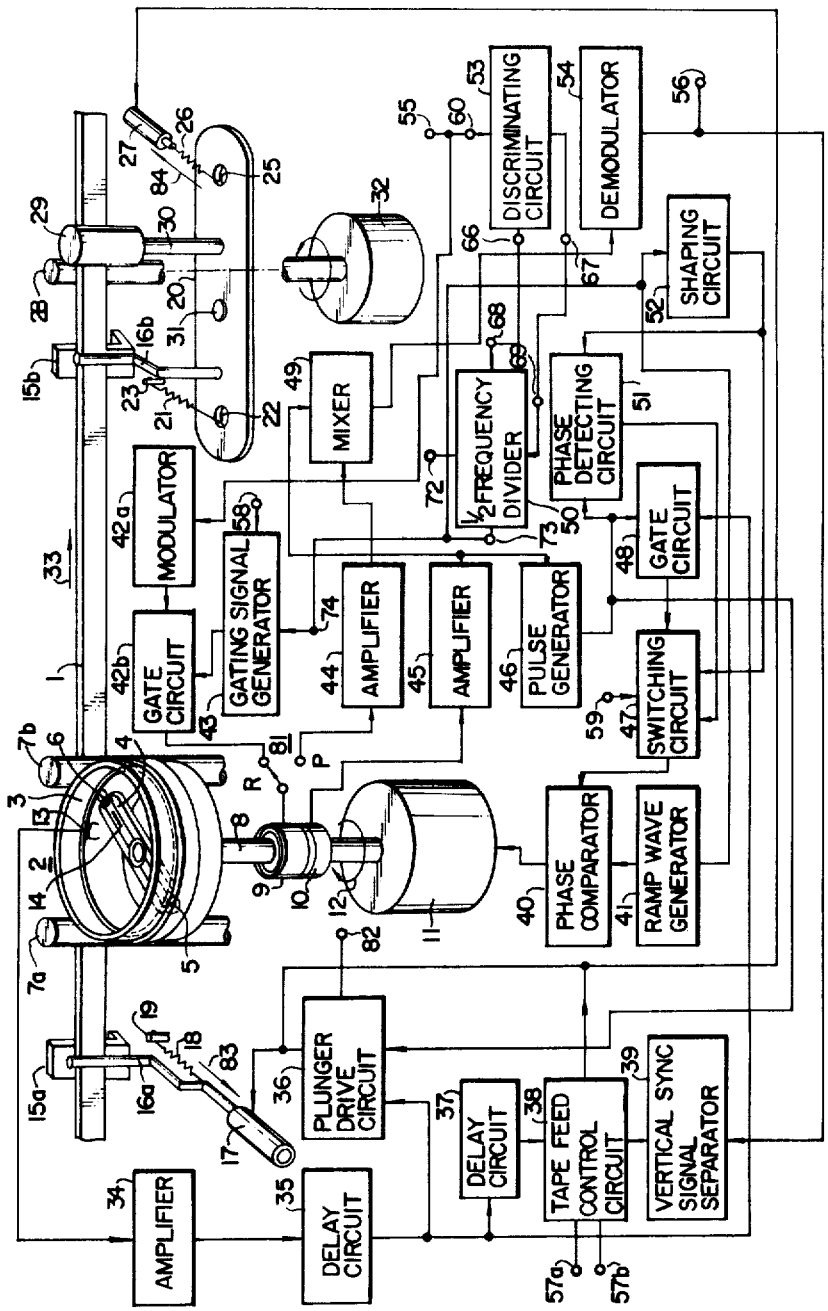

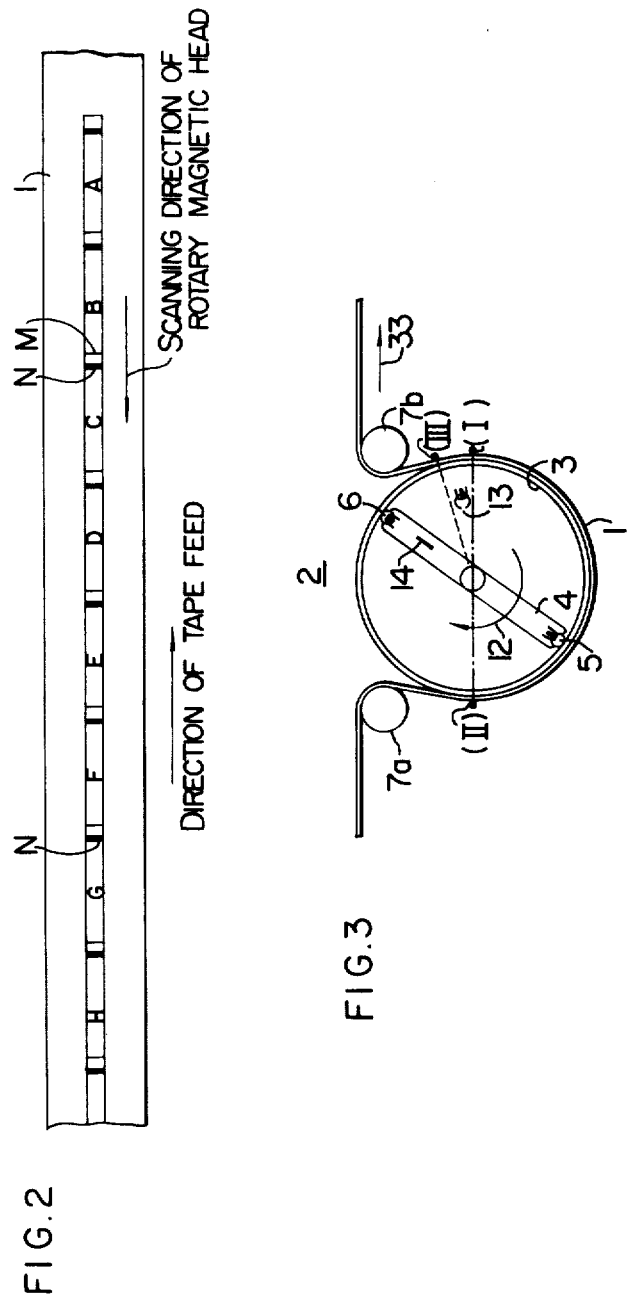

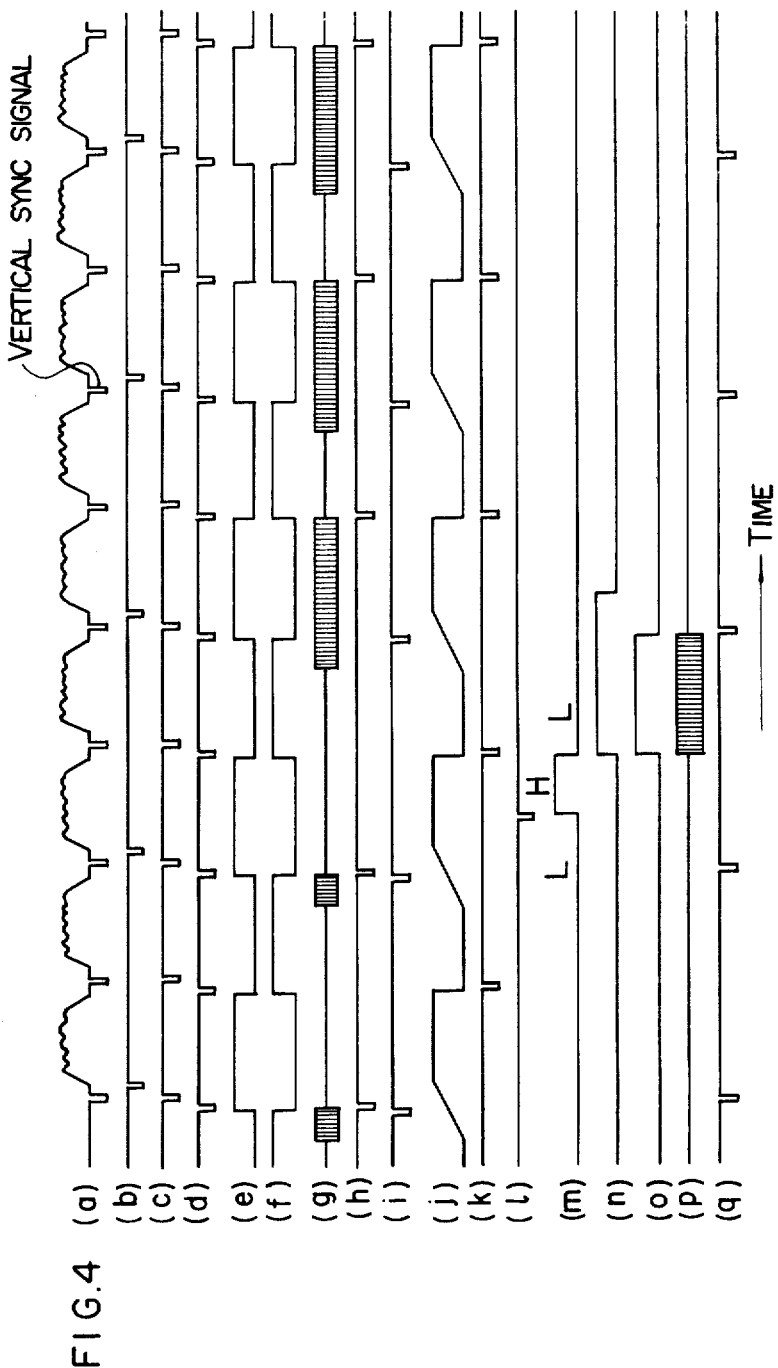

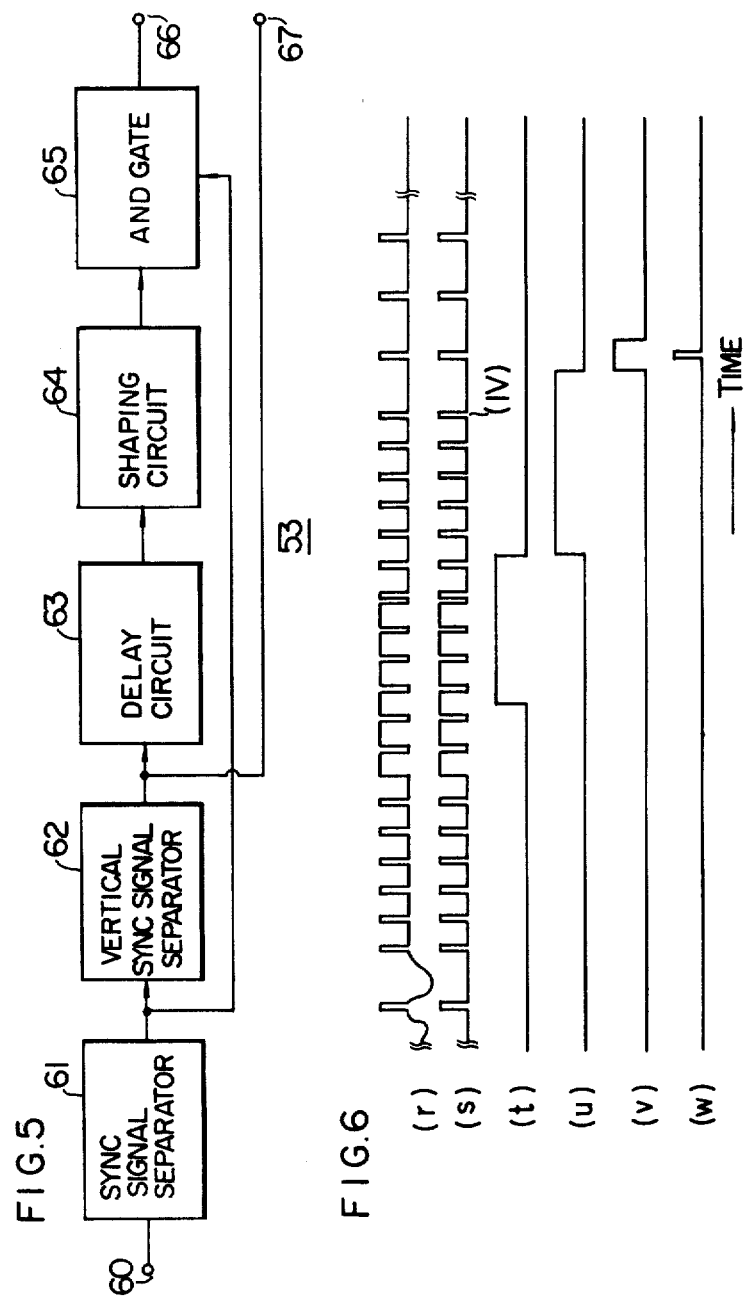

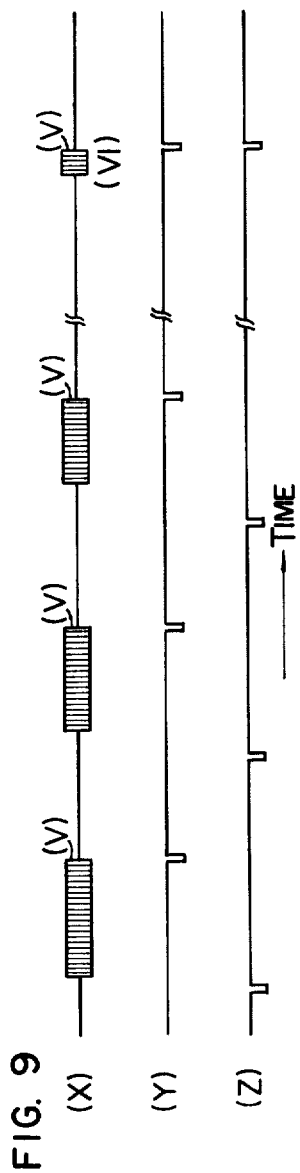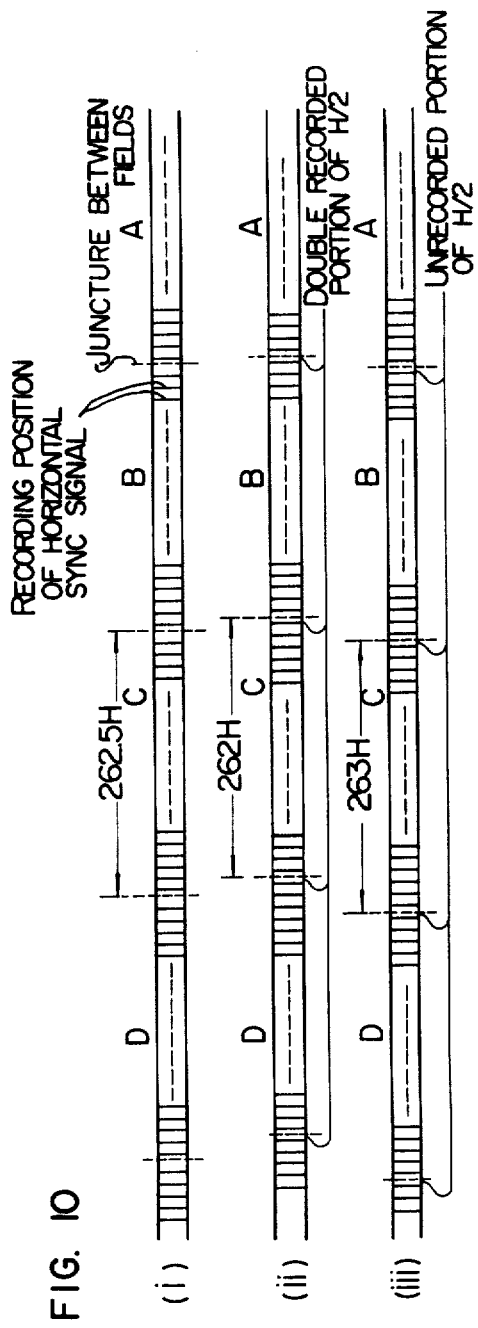
FIG. 9
FIG. 10

MAGNETIC RECORDING SYSTEM

This invention relates to a magnetic recording system using a rotary magnetic head for recording video signals on a magnetic tape.

An object of the invention is to provide a magnetic recording system, which permits obtaining of a number of successive still pictures reproduced at a predetermined time interval (for instance 3.6 seconds) from a magnetic tape.

Another object of the invention is to provide a magnetic recording system, which permits recording of different video signals in successive record track portions of the same length on a magnetic tape so as to permit satisfactory reproduction.

A further object of the invention is to provide a magnetic recording system, which permits recording of different video signals of a unit period (for instance one field) in successive record track portions one continuous to the preceding one on a magnetic tape so as to permit satisfactory reproduction.

A further object of the invention is to provide a magnetic recording system, which permits recording of different video signals of a unit period in successive record track portions one continuous to the preceding one on a magnetic tape while maintaining a fixed horizontal sync signal phase not shifted at the juncture between adjacent record track portions so as to permit satisfactory reproduction.

A still further object of the invention is to provide a magnetic recording system, which permits correction of a video signal record in a desired track portion of a unit period in a signal track previously recorded on a magnetic tape or, further, permits making a record of a desired video signal at a desired track portion in addition to the previous record at the other portions in the signal track, without affecting the video signal recorded in the other track portions.

In other words, according to the invention, the following effects can be obtained when recording a video signal field by field on a magnetic tape in the lengthwise direction thereof: (1) It is possible to record different video signal portions each covering a period MH (M being an integer close to 262 and H being the horizontal sync signal period) one portion continuous to the preceding one. (2) It is possible to successively record different video signal fields while maintaining a fixed horizontal sync signal phase not shifted at the juncture between adjacent field record portions. Thus, a number of still pictures can be excellently reproduced on a television receiver. (3) It is also possible to simply and preferably make a desired record of signal on a signal-track portion desired in a video signal track previously recorded on a magnetic tape, without affecting the record of signals previously recorded in the other track portions.

The above and further objects and novel features of the invention will become more fully apparent from the following detailed description when the same is read in connection with the accompanying drawings. It is to be expressly understood, however, that the drawings are given for the purposes of illustration only and not intended as a definition of the limits of the invention.

FIG. 1 is a block diagram of an example of the essential part of the magnetic recording system according to the invention.

FIG. 2 is a view showing an example of the magnetic record track pattern obtained in accordance with the invention.

FIG. 3 is a top view of the rotary magnetic head assembly shown in FIG. 1.

FIG. 4 is a waveform chart showing signals appearing at various parts of the system of FIG. 1.

FIG. 5 is a block diagram of the field discriminating circuit shown in FIG. 1.

FIG. 6 is a waveform chart showing signals appearing at various parts of the circuit of FIG. 5.

FIG. 9 is a waveform chart showing signals appearing at certain important parts of the system of FIG. 1.

FIG. 10 is a view showing examples of the record track pattern obtained in accordance with the invention.

Figure 7:
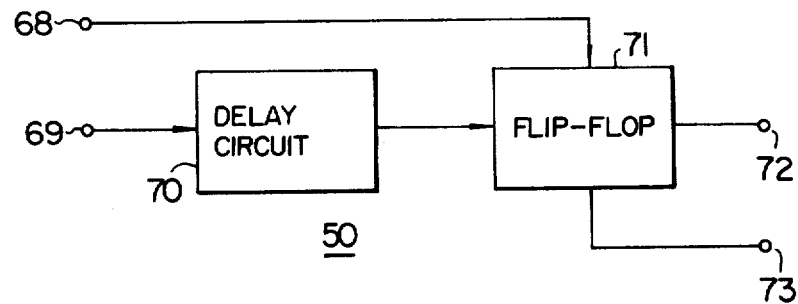
FIG. 7 is a block diagram of the ½ frequency divider shown in FIG. 1.

The invention will now be described in conjunction with an embodiment thereof with reference to the accompanying drawings.

FIG. 1 shows an embodiment of the invention. Here, a magnetic tape 1 (hereinafter referred to as tape) is passed around the periphery of a drum 3 of a rotary magnetic head assembly 2. A video signal of one field is recorded by rotary magnetic heads 5 and 6 on the tape 1. After recording one field of a video signal, the tape 1 is moved in the direction of arrow 33 by a distance corresponding to a tape portion where the aforementioned field of the video signal is recorded, and then another field of a video signal is recorded on a succeeding blank portion of the tape. In this way, a continuous video signal track is formed on the tape 1 as shown in FIG. 2. According to the invention, different fields A, B, C, ... as shown in FIG. 2 are recorded on respective track portions of the same length. Also, adjacent record track portions are made continuous to one another, and the horizontal sync signal is made consistent; that is, the same phase of horizontal sync signal is maintained, throughout the continuous track of the successively recorded fields.

To record one field of video signal on a tape portion of a fixed length, the rotary magnetic heads 5 and 6 shown in FIG. 1 have to be rotated at a constant speed. Also, to record one field extracted from a continuous video signal including sync signals on the tape 1, the rotational phase of the rotary magnetic heads 5 and 6 has to be controlled since it is necessary to record that field of video signal while the corresponding portion of the tape on the drum is in contact with either one of these rotary magnetic heads. In the instant embodiment, the tape 1 is wound on the rotary magnetic head assembly 2 in a manner as shown in FIG. 3, which is a top view of the assembly shown in FIG. 1; that is, the tape 1 is passed around a portion of the periphery of the drum 3 subtending at least 180° by means of tape guides 7a and 7b. The rotary magnetic heads 5 and 6 are mounted at opposite ends of a rotary head bar 4, which is rotated in the direction of arrow 12 at a rate of 1,800 rpm (30 rps). The rotary magnetic heads 5 and 6 are angularly spaced apart by 180°. In the case of the Japan and U.S.A. standard television system where the field frequency is 60 Hz (59.95 Hz in the case of a color signal), one field is covered by one-half rotation of the rotary magnetic head 5 or 6 rotating at the afore-mentioned speed of 30 rps. In FIG. 3, one field of a video signal can be recorded on the portion of the tape 1 in contact with the drum 3 between points (I) and (II); namely intersections of a line passing through the center of rotation of the rotary heads and drum periphery. A method of controlling the rotary heads to record one field of video signal over a certain portion of the periphery of the drum 3 will now be discussed.

A video signal for recording as shown at $a$ in FIG. 4 is coupled to a terminal 55 shown in FIG. 1. This signal is a continuous signal including sync signals, and is supplied to a discriminating circuit 53 for discriminating even and odd fields and also to a modulator 42$a$. The discriminating circuit 53 may have a construction as shown in the block diagram of FIG. 5, and a video signal as shown at $r$ in FIG. 6 is supplied to a terminal 60 (same as the terminal 55 in FIG. 1). The signal $r$ in FIG. 6 is an enlarged-scale representation of the vertical sync signal in an odd field video signal shown at $a$ in FIG. 4, and its polarity is shown inverted with respect to the signal $a$ in FIG. 4 to facilitate the understanding of the waveform of the sync signal.

The video signal $r$ in FIG. 6 coupled to the terminal 60 is fed to a sync signal separator circuit 61 to obtain only the sync signal as shown at $s$ in FIG. 6. The sync signal so obtained is supplied to a vertical sync signal separator circuit 62 to derive only the vertical sync signal from it and also to an AND gate circuit 65. The vertical sync signal separator circuit 62 produces at its output a signal as shown at $t$ in FIG. 6. This signal is produced by integrating the sync signal $s$ and shaping the integrated signal as is well known in the art, so that it is somewhat delayed with respect to the vertical sync signal $s$ including an equivalent pulse series. Next, the signal is supplied to a delay circuit 63 consisting of a mono-stable multi-vibrator to produce a positive delayed pulse shown at $u$ in FIG. 6, with its leading edge coinciding with the trailing edge of the vertical sync signal $t$ in FIG. 6 and its trailing edge lagging about ¾ H (H being the horizontal sync signal period of 63.5 μs) behind the trailing edge of the equivalent pulse series (IV). Namely, a delayed pulse as shown at $u$ in FIG. 6 is obtained from the delay circuit 63. This positive delayed pulse is supplied to a shaping circuit 64 to provide a signal as shown at $v$ in FIG. 6, having a duration covering the first horizontal sync signal as counted from the trailing edge of the equivalent pulse series (IV). The signal $v$ is supplied to the AND gate circuit 65, to which the sync signal output of the sync signal separator circuit 61 is also supplied, so that the first horizontal sync signal as shown at $w$ in FIG. 6 is provided from the AND gate circuit 65. Although the first horizontal sync signal is derived in the case of an odd field in this way, in the case of an even field such a first horizontal sync signal is not provided since in this case the horizontal sync signal as shown at $r$ in FIG. 6 is shifted by ½ H.

In the above manner, the signal $w$ in FIG. 6, for discriminating whether the relevant field is odd or even, is obtained from a terminal 66. In the presence of a continuous video signal, this signal is produced for each odd field, as shown at $b$ in FIG. 4. The polarity of the signal $b$ in FIG. 4 is shown inverted with respect to the signal $w$ in FIG. 6 for the sake of the description.

The field discrimination pulse signal (signal $b$ in FIG. 4 obtained from the terminal 66) and the vertical sync signal (signal $c$ in FIG. 4 obtained from the terminal 67), these signals being obtained by the discriminating circuit 53, are fed to a ½ frequency divider circuit 50 comprising a delay circuit and a flip-flop. The frequency divider 50 produces rectangular wave signals $e$ and $f$ shown in FIG. 4, which are inverted for each field. The process in which these signals are produced will now be discussed in detail. The ½ frequency divider 50 has a specific circuit construction as shown in FIG. 7, comprising a delay circuit 70 and a flip-flop 71, with the afore-mentioned field discrimination pulse signal and vertical sync signal being coupled to respective terminals 68 and 69. The vertical sync signal coupled to the terminal 69 is supplied to the delay circuit 70 to produce a delayed signal delayed by about 16/17 V (V being the vertical sync signal period of 16.6 ms), as shown at $d$ in FIG. 4. This delayed signal is coupled to the flip-flop 71 for frequency division to ½, while the field discrimination pulse signal is also coupled to the flip-flop 71. Thus, if the flip-flop is set for each odd field and produces the signals shown at $e$ and $f$ in FIG. 4 are obtained from the respective terminals 72 and 73. The delaying and ½ frequency division of the vertical sync signal in this way, are done for the purpose of obtaining a control signal for rotating a drum motor 11 at a speed corresponding to one-half the field frequency, i.e., 30 rps, as will be discussed later in detail. The delaying of the vertical sync signal in the delay circuit 70 is done in order to set the juncture M between adjacent field record portions apart from the position N of recording of the relevant vertical sync signal as shown in the record pattern of FIG. 2.

Figure 8:
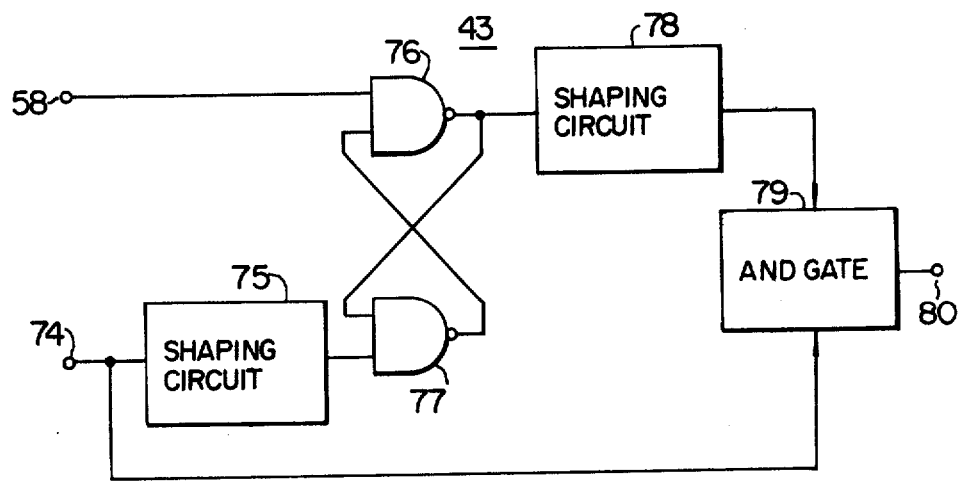
FIG. 8 is a block diagram of the gating signal generator circuit shown in FIG. 1.

Of the two signals $e$ and $f$ obtained from the respective output terminals 72 and 73 of the ½ frequency divider 50, the signal $f$ is coupled to a gating signal generating circuit 43, a ramp wave generator 41 and to a shaping circuit 52. The gating signal generator circuit 43 serves to produce a gating signal for extracting one field to be recorded from the continuous video signal $a$ in FIG. 4. It may have a construction as shown in FIG. 8. The signal $f$ in FIG. 4 obtained from the terminal 73 of the ½ frequency divider 50 is coupled to a terminal 74 shown in FIG. 8. Also, if it is desired to record the video signal appearing at the terminal 55 while monitoring it with a monitor television receiver, a signal as shown at $l$ in FIG. 4, which may be produced by manually operating a push button or like means, is coupled to a terminal 58. The signal $f$ in FIG. 4 coupled from the ½ frequency divider 50 to the terminal 74 is fed to a shaping circuit 75 including a differentiator to obtain a signal $k$ in FIG. 4. This signal is coupled to an RS flip-flop consisting of NAND gate circuits 76 and 77. Upon impression of a pulse of this signal the output of the NAND gate circuit 76 in the RS flip-flop is rendered to an ordinary "L" level as shown at $m$ in FIG. 4. When the pulse signal as shown at 1 in FIG. 4 impressed upon the terminal 58 is coupled to the NAND gate circuit 76 the output thereof is inverted to an "H" level as shown at $m$ in FIG. 4, but it is subsequently inverted back to the "L" level upon impression of the subsequent pulse of the signal $k$ in FIG. 4. The signal as shown at $m$ in FIG. 4 is thus obtained. Next, the signal is coupled to a shaping circuit 78 including a delay circuit to produce a pulse shown at n in FIG. 4, having a duration of about 1.5 V from the instant of the level change of the signal m in FIG. 4 from "H" to "L" level. The pulse duration of 1.5 V is by no means limitative, but it may be between 1 V and 2 V from the outset of the even field. (Actually, it covers a part of the preceding odd field as is apparent from the above description.) The signal n in FIG. 4 is supplied to an AND gate circuit 79, to which the signal f in FIG. 4 coupled from the ½ frequency divider 50 to the terminal 74 is also supplied. Thus, a pulse o shown in FIG. 4, having a duration of 1 V corresponding to one even field, is obtained from an output terminal 80 of the AND gate circuit 79. It will be appreciated that with this construction a pulse of a duration of 1 V representing an even field is obtained whenever a pulse as shown at l in FIG. 4 is produced through manual operation.

The pulse signal with the duration of 1 V is coupled to a gate circuit 42b, having an amplifying function, to which an output signal of the frequency modulator 42a frequency modulating the video signal supplied to the terminal 55 is also coupled. In the magnetic recording and reproduction of a video signal, it is usual to record the video signal in the form of a frequency modulation in order to eliminate such undesired effects as variations of the signal level resulting from variations of contact pressure between magnetic tape and magnetic head and also from the standpoint of difficulties in recording low frequency signals. Thus, the frequency modulated video signal for a duration of 1 V as shown at p in FIG. 4 is obtained at the output of the gate circuit 42b and it is coupled through a contact R of a switch 81 and a rotary transformer 9 to the rotary magnetic head 5 shown in FIG. 1 for recording on the tape. Meanwhile, the rotary magnetic heads have to be controlled such that during the presence of this signal the head 5 is found on the drum periphery half in contact with the tape. This aspect will now be discussed in detail.

The comparison of ramp wave generator 41 produces a ramp wave as shown at j in FIG. 4 on the basis of its input signal f in FIG. 4 produced from the ½ frequency divider 50. This ramp wave signal is coupled to one input terminal of a phase comparator 40, while the other input to the phase comparator is obtained in a manner to be described hereinafter.

Recording the first field A as shown in FIG. 2 will now be described. Before the recording of this field the tape is blank; that is, it carries no record. A stationary magnetic head 13 shown in FIGS. 1 and 3 is provided to detect the rotational phase of the rotary magnetic heads 5 and 6 such that it produces a pulse every time a permanent magnet 14 mounted on the rotary magnetic head bar 4 clears it, and this pulse signal is coupled to the phase comparator 40. More particularly, the output of the stationary magnetic head 13 is amplified through an amplifier 34, whose output is delayed through a delay circuit 35 to obtain an output as shown at i in FIG. 4. The delay circuit 35 may be omitted by varying the position of the stationary magnetic head 13 such as to obtain the signal i in FIG. 4. However, it is troublesome to mechanically adjust the head position, and the provision of the delay circuit 35 is advantageous for obtaining a signal representing a given rotational phase of the rotary magnetic head 5 by electrically adjusting the delay time of the delay circuit 35. The output signal of the delay circuit 35 is coupled through a gate circuit 48, which discriminates the presence or absence of its two input signals and passes only one of these signals to be described later, and also through a switching circuit 47 to be described later to the phase comparator 40.

With this signal coupled to the phase comparator 40, to which the ramp wave signal j in FIG. 4 is also coupled from the ramp wave generator 41 as mentioned earlier, it produces a phase difference signal by gating the slanted portions of the ramp wave under the control of the rotational phase pulse and holding the gated signal. By supplying this phase difference signal to the motor 11 which is phase controllable, the rotary magnetic heads 5 and 6 on the rotary magnetic head bar 4 integral with a motor shaft 8 can be rotated in a predetermined phase relation to the vertical sync signal in the input video signal a in FIG. 4. Under this control, an even field can be recorded while the rotary magnetic head 5 is in contact with the tape; that is, it is between the points (I) and (II) on the drum as shown in FIG. 3. More particularly, when the rotary magnetic heads 5 and 6 are controlled in the above manner, an even field of the video signal may be recorded on the tape whenever a recording command is given to the input terminal 58 of the gating signal generator circuit 43.

Subsequent to the recording of the first field A shown in FIG. 2 in the above manner, the next field, i.e., field B, is recorded in a manner to be described later. For recording the field B, the tape portion for recording this field B has to be brought onto the drum periphery by moving the tape 1 on which the field A is already recorded. The method of moving the tape 1 to this end will now be described. The tape is first kept still until the first field A is recorded by a tape keeping mechanism comprising fixed plates 15a and 15b and respectively associating tape keep bars 16a and 16b, as shown in FIG. 1. Unless plungers 17 and 27 are activated, the tape keep bar 16a is held in forced contact with the plate 15a via the tape by a biasing spring 18 stretched between the tape keep bar 16a and a fixed pin 19, and also the other tape keep bar 16b is held urged against the tape by a similar spring 21. To move the tape, it is unlocked, while at the same time a pinch roller 29 is urged against a capstan 28 rotated by a capstan motor 32. These two actions have to be effected simultaneously. A method for achieving this will now be described in connection with FIG. 1. To feed the tape which is held still until the field A shown in FIG. 2 is recorded, a tape drive command is given by means of a push button to a terminal 82 of a plunger drive circuit 36, whereupon the plunger drive circuit 36 causes a current to pass through the plungers 17 and 27 to pull the movable rods of these plungers 17 and 27 in the directions of arrows 83 and 84. As a result, the tape keep bar 16a is separated from the tape, while a movable plate 20 carrying the other tape keep bar 16b is rotated about a support point 31 to separate the tape keep bar 16b from the tape simultaneously with the separation of the tape keep bar 16a. At the same time, the pinch roller 29 with its shaft 30 secured to the movable plate 20 is moved toward the capstan 28 and urged thereagainst via the tape 1 as the movable plate 20 is rotated in the direction of arrow 84. In this way, the tape 1 can be driven at a constant speed by the capstan 28 and pinch roller 29. To stop the tape 1, the drive current from the plunger drive circuit 36 to the plungers 17 and 27 is cut as is apparent from the above.

To feed the tape 1 for the length of the record of the field A recorded on the tape the plungers 17 and 27 may be held activated for the corresponding period of time as is apparent from the above. To do so, the tape feed command signal is impressed upon the terminal 82 of the plunger drive circuit 36 to commence the tape progress. Meanwhile, the reproduced signal of the already recorded field A is obtained from the rotary magnetic head 16. The control of the motor 11 at this time will be described later. If the motor 11 is rotated at substantially the same speed as that at the time of recording the field A, a signal as shown at $x$ in FIG. 9 is obtained from the rotary magnetic head 6. The waveform of this signal is similar to that of the recorded signal. It will be seen that the duration of the reproduced signal is shorter the farther the recorded field portion of the tape is away from the drum 3. This signal is coupled through a rotary transformer 10 to an amplifier 45, and the amplified signal therefrom is coupled to a pulse generator 46 to obtain a signal as shown at $y$ in FIG. 9. Each pulse in this signal is produced when the pulse generator 46 detects the leading end of the corresponding reproduced signal shown at $x$ in FIG. 9, that is, the leading end of the field A (V). The output of the pulse generator 46 is coupled to the plunger drive circuit 36, to which the output signal ($z$ in FIG. 9) from the delay circuit 35 representing the rotational phase of the rotary magnetic head 6 is also coupled. The phases of these two inputs to the plunger drive circuit 36 coincide with each other at a certain instant after the tape feed is started. This aspect of the invention will now be discussed in further detail. As mentioned earlier, the field A is recorded on a tape portion passed round the drum 3 between the points (I) and (II) and thereof while the tape 1 is kept still. With the subsequent movement of the tape in the direction of arrow 33, the leading end (V) of the reproduced signal $x$ in FIG. 9 gradually deviates from the rotational phase of the point (II). However, the pulse of the rotational phase of the rotary magnetic head 6 as produced from the delay circuit 35 appears just when the rotary magnetic head 6 comes to the point (I) on the drum, and it indicates the position of the point (I) on the drum irrespective of the movement of the tape. This means that the phases of the aforementioned two signals coincide with each other when the trailing end of the record of the field A comes to the position of the point (I). Thus, by cutting the current supplied from the plunger drive circuit 36 to the plungers 17 and 27 to stop the tape upon reaching of this point of phase coincidence a blank tape portion for recording is just held between the points (I) and (II) on the drum 3.

Since the blank portion for recording can be brought between the points (I) and (II) on the drum 3, the field B is assumed to be recorded on a tape portion contiguous to that of the previous field A if the motor 11 is phase controlled for recording the field B in the same manner as at the time of recording of the field A. More particularly, through the phase control using as control signal the signal $i$ in FIG. 4 produced from the delay circuit 35 delaying the output of the stationary magnetic head 13 in FIG. 3 by a predetermined delay time, an even field can be recorded when the rotary magnetic head 6 comes between the points (I) and (II) on the drum 3. However, though the tape is designed so as to be fed as mentioned above to be stopped when the trailing end of the previous record comes to the position of the point (I), the tape may fail to be stopped right at the electrically specified instant, that is, the trailing end of the recorded field may fail to come to the point (I) on the drum at the specified instant, due to mechanical play involved in the operation of the tape keep bars 16a and 16b. In such a case, that is, if an overshoot from the point (I) takes place, a blank tape portion intervening between the portion of the previously recorded field A and the portion for recording the field B may result because the recording is made between the points (I) and (II) in the above servo control system. In order to eliminate such an event the afore-mentioned mechanical play should be completely eliminated, but this is very difficult. The elimination of this drawback can be realized simply by an electrical method to be discussed hereinafter.

Since the tape 1 is passed round a portion of the periphery of the drum 3 subtending more than 180°, it is possible to arrange such as to reproduce part of the field A by the rotary magnetic head 6 between points (I) and (III) on the drum 3 to obtain a signal (VI) as shown in the signal $x$ in FIG. 9. This signal is also shown in the signal $g$ in FIG. 4. By amplifying this signal and coupling to the pulse generator 46 a signal shown at $h$ in FIG. 4 is obtained from the pulse generator 46. The signals $g$ and $h$ in FIG. 4 include respective signals, which correspond to the aforementioned signal (VI) in the signal $x$ in FIG. 9 and are reproduced before the recording of the field B, and subsequent signals, which are different from the preceding ones and reproduced after the recording of the field B. Before the field B is recorded, only the signal (VI) is generated. The pulse signal obtained from the signal (VI) is coupled to a phase detecting circuit 51 and the gate circuit 48. The gate circuit 48, to which the signal $i$ in FIG. 4 from the delay circuit 35 delaying the signal from the stationary magnetic head 13 is also coupled, functions to permit the output signal of the pulse generator 46, i.e., signal $h$ in FIG. 4, to the subsequent switching circuit 47 so long as the signal $h$ is provided while permitting the rotary magnetic head rotational phase pulse, i.e., output signal of the delay circuit 35, to the switching circuit 47 in the absence of the signal $h$, that is, when no signal is recorded on the tape. Prior to recording the switching circuit 47 couples the output signal of the gate circuit 48 to the phase comparator 40. (When recording the field B it couples the signal $h$ in FIG. 4 obtained from the pulse generator 46 to the phase comparator 40.) In the phase comparator 40, to which the signal $j$ in FIG. 4 obtained from the ramp wave generator 41 is also coupled, the slanted portions of the ramp wave are sampled for holding under the control of the output signal ($h$ in FIG. 4) of the pulse generator 46, thus obtaining the phase difference signal coupled to the motor 11. Through the above control of the motor 11 an even field can be recorded as the field B by the rotary magnetic head 5 just from the trailing end of the record of the field A. Under this condition, by applying a recording command signal to the terminal 58 of the gating signal generator circuit 43 the field B can be recorded and made perfectly continuous to the field A.

As soon as the field B is recorded, it is reproduced by the rotary magnetic head 6 in the manner shown at $g$ in FIG. 4. In consequence, the pulse generator 46 produces a different output from the previous one, thus changing the phase difference voltage obtained from the phase comparator 40, as will be apparent from FIG. 4. With a change of the phase difference voltage the rotation of the motor 11 which is controlled according to this voltage is disturbed. Although this disturbance of the motor speed presents no particular problems since it takes place after the field B is recorded, in such case as when feeding the tape immediately after the recording steady rotation of motor 11 free from disturbance is preferred because the length of the tape to be fed is controlled on the basis of the reproduced signal as mentioned earlier. Accordingly, the motor 11 is controlled in the following manner.

The signal $q$ in FIG. 4 is provided from the shaping circuit 52 including a delay circuit, and it is practically in phase with a portion of the output signal $h$ in FIG. 4 obtained prior to recording from the pulse generator 46. As is seen from comparison with the signal $h$, the signal $q$ has a fixed phase, that is, its phase practically coincides even after recording with the phase of the signal $h$ before recording. This signal is supplied after recording to the phase comparator 40, whereby the phase difference voltage can be held at the value before recording.

The switching circuit 47, through which the output signal of the shaping circuit 52 is coupled to the phase comparator 40 after recording, also functions to couple the output signal of the gate circuit 48 to the phase comparator 40 before recording. By applying a recording command signal that is applied to the gating signal generator circuit 43 for recording also to the input terminal 59 of the switching circuit 47, the switching circuit 47 is switched to supply the output signal of the shaping circuit 52, i.e., signal $q$ in FIG. 4, to the phase comparator 40 after recording.

In the state with the output signal of the shaping circuit 52 coupled to the phase comparator 40, no phase control loop is formed, but the motor speed is substantially the same as when the phase control is in force. However, if the phase control loop is left open after recording, the next field C will not be recorded on a tape portion continuous to that of the preceding field B. Accordingly, the phase control loop, which has been tentatively opened after recording of the field B, is smoothly recovered for recording the next field C. For smoothly recovering the phase control loop it is necessary to avoid a sudden change of the phase difference voltage of the phase comparator 40. In other words, smooth recovery of the phase control loop can be realized insofar as the control signal coupled from the switch circuit 47 to the phase comparator 40 does not undergo substantial phase shift. In the open state of the phase control loop after the recording, the rotational phase is gradually shifted from the initial phase, and at a certain instant the phases of the output signal of the pulse generator 46 and the output signal of the shaping circuit 52 being coupled to the phase comparator 40 coincide with each other. At this instant, the output signal of the shaping circuit 52 having been coupled to the phase comparator 40 is switched over to the output signal of the pulse generator 46. This switching of signals is undertaken by the switching circuit 47, while the role of detecting the coincidence of the phases of these two signals is taken by the phase detecting circuit 51. In other words, while the switching circuit 47 couples the output signal of the shaping circuit 52 to the phase comparator 40 for some period after recording, upon detection of the instant of coincidence of the phases of the afore-mentioned two signals by the phase detecting circuit 51 it receives a signal switching command pulse from the phase detecting circuit 51, whereupon it is switched to couple the signal of the pulse generator 46 to the phase comparator 40. In this way, the phase control loop is reformed prior to recording. The switching of signals as mentioned above may take place while the tape is remaining still after recording or while the tape is being fed in the case no problem occurs and where the tape is fed immediately after recording. In either case, the motor can be driven steadily without any speed disturbance. In the above way, the field B can be recorded after the recording of the field A, and the subsequent fields C, D, E, . . . can also be recorded entirely in the same manner.

Now, a method of recording successive fields at a consistent or fixed phase of horizontal sync signal not shifted at the juncture between adjacent recorded fields will be discussed.

While the description so far has been concerned with the method of recording even fields A, B, C, . . . without any intervening blank tape portion left between adjacent field record portions, with the arrangement of the rotary magnetic heads 5 and 6 angularly spaced apart 180° from each other consistency of the horizontal sync signal phase is not obtained, a is, the phase of the horizontal signal in one recorded field is not consistent with that of the next recorded field. For example, a video signal record pattern as shown at (i) in FIG. 10 results. Since each field covers a time length of 262.5 H (H being the horizontal sync signal period), a phase shift of ½ H results at the juncture between adjacent fields if the recorded fields are all even fields. If there are such phase shift points, the continuously reproduced signal of the fields A, B, C, . . . will lead to distortion of an upper portion of the picture on a monitor television receiver. This distortion is commonly termed skew and is greatest when the phase shift is ½ H. Of course, this can be eliminated by providing for a consistent horizontal sync signal phase not shifted at the juncture between adjacent fields, and the following methods can be employed to this end.

A first method is applicable where the rotary magnetic heads 5 and 6 are arranged at the spacing of 180°. Here, even fields and odd fields are alternately recorded instead of recording only the even fields. By so doing, it is possible to maintain a fixed horizontal sync signal phase without any shift involved at the juncture between adjacent fields. The alternate recording to even and odd fields may be readily achieved since the wave signals $e$ and $f$ in FIG. 4 representing the respective even and odd fields are available from the aforementioned ½ frequency divider 50 for the selection of the field to be recorded. In this case, different signals have to be coupled to the phase comparator 40, and essentially this can be achieved by using the motor phase control system described above.

Figure 11:
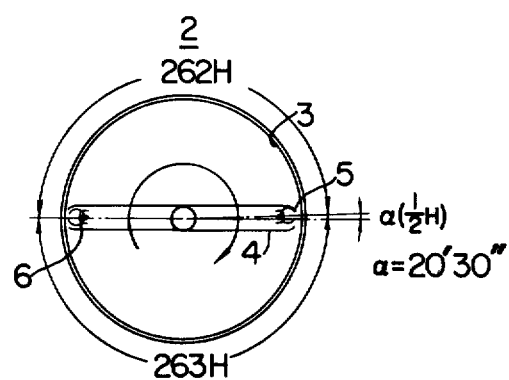
FIGS. 11 and 12 illustrate the disposition of the rotary magnetic head used for the magnetic recording system according to the invention.
Figure 12:
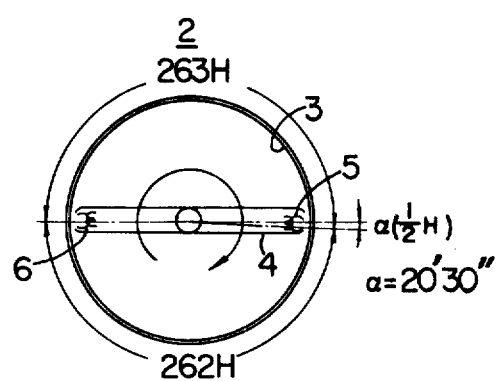

In a second method, the rotary magnetic heads 5 and 6 in the rotary magnetic head assembly 2 are not spaced apart by 180° but are arranged such as to subtend angles in a ratio of 262 to 263, specifically angles (180° − 20′ 30″) and (180° + 20′ 30″) as shown in FIGS. 11 and 12. With this arrangement, the rotary magnetic head 5 for recording may be delayed by ½ H with respect to the case of the 180° arrangement. Thus, a consistent horizontal sync signal phase free from any shift at the juncture of adjacent fields, as shown at (ii) in FIG. 10, can be obtained with the arrangement of FIG. 11. If this arrangement is employed for recording fields of 262.5 H, a doubly recorded portion or overlap portion of ½ H will result at the juncture between adjacent fields. This, however, gives rise to no problem in the case of recording frequency modulated signals because the preceding record in the overlap portion is erased to leave only the subsequently recorded signal. In this case, the length of each recorded field is 262 H.

With the arrangement of FIG. 12 a record pattern as shown at (iii) in FIG. 10, with each field covering a length of 263 H, can be obtained. Although this arrangement gives rise to a blank portion of ½ H at the juncture, this blank portion will not be noted on the reproduced picture inasmuch as it is located near the vertical blanking pulse. Further, as a modification the heads may be arranged such as to subtend angles in a ratio of 261 to 264, whereby consistency of the horizontal sync signal phase free from shift at the juncture may be obtained as well. Theoretically, the heads may be spaced to subtend angles $\theta A$ and $\theta B$ satisfying relations $$\left.\begin{array}{c} \frac{\theta A}{\theta S} = \alpha \\ \\ \text{and} \quad \frac{\theta B}{\theta S} = \beta \end{array}\right\} \quad (1)$$

where $\alpha$ and $\beta$ are positive integers such that $\alpha + \beta = 525$ and $\theta S = 360°/525°$. However, by excessively increasing the ratio between the subtended angles the overlap portion or blank portion will be increased to an appreciable extent, so it is desirable to select $\alpha$ and $\beta$ so as to be substantially equal to 260, 261, 262, 263, 264 or 260 to about 265.

In a third method for obtaining a consistent horizontal sync signal phase free from any shift at the juncture of adjacent fields, the recording period is controlled while employed the afore-mentioned 180° arrangement of rotary magnetic heads. The phase control of the rotary magnetic heads may be done in the same way as mentioned earilier. Here, the recording period is made to be an integral multiple MH (M being a positive integer) of the horizontal sync signal period H (63.5 $\mu$ sec. in the Japan and U.S.A. standard television system), and only even fields (or only odd fields) are recorded. The multiplying factor M is desirably close to 262, for instance with a range between 260 and 264. As an example, the case of recording only even fields of 260 H with the arrangement of FIG. 3 will now be considered. If the first field A is recorded from the point (I) and the points (I) and (II) which are peripherally spaced apart by a length corresponding to 262.5 H, a blank portion covering 2.5 H adjacent to the point (II) results. Then, by feeding the tape and recording the next field B of 260 H from the trailing end of the field A, the record of field B may be made continuous to the record of field A, and also the horizontal sync signal phase may be made consistent. In this case, it is necessary to effect the record during, for example, from the first horizontal sync signal to the 260th horizontal sync signal in each of the fields of 260 H to be recorded. While the above description is concerned with the recording method, reproduction will now be described.

If the tape is not fed after recording one field of video signal on it, the tape portion of this recorded field is found in the neighborhood of the drum periphery portion between the points (I) and (II). (However, it is not exactly located between the points (I) and (II) as mentioned earlier.) At this time, the rotary magnetic head 5 which has previously been used for recording is now used as the reproducing head together with the reproducing head 6 to reproduce the same field, whereby a continuous video signal is obtained. More particularly, since the two rotary magnetic heads are substantially spaced apart by 180° and also the record length of one field is substantially one half of the whole periphery of the drum, a continuous video signal can be obtained by reproducing the same field alternately by the two rotary magnetic heads. In the arrangement where the magnetic heads are spaced apart just by 180°, the length of the tape between both heads corresponds to 262.5 H, so that the horizontal sync signal phase is shifted by 2/1H at the juncture between adjacent reproduced video signal fields. In this case, therefore, the resultant picture reproduced on a monitor television receiver is distorted at the afore-mentioned juncture portion. This distortion is skew, and to remove it the heads may be arranged to satisfy the relation of equations 1, whereby the horizontal sync signal phase can be made consistent at the juncture. While the method of alternately recording even and odd fields and method of controlling the record length for the purpose of obtaining consistent horizontal sync signal phase has been decribed above in connection with the 180° arrangement of the heads, in these methods the angular spacing between the heads is not limited to 180°, but it is possible to set any desired spacing. In case the spacing is not 180°, the rotational phase of the motor 11 may be controlled so as to commence recording from the trailing end of the previous record. This may be readily achieved by controlling the phase of the pulse signal obtained from the pulse generator 46, for instance by means of a delay circuit such as a monostable multi-vibrator incorporated in the pulse generator 46. Thus, so long as the heads are spaced such as to satisfy the relation of equations 1, in recording it is possible to obtain field records one continuous to the next one and also consistency of the horizontal sync signal phase free from any shift at the juncture between adjacent fields, so that in playback picture reproduction free from the afore-mentioned skew can be obtained. The reproduced signal obtained from the rotary magnetic heads 5 and 6 are coupled through the respective rotary transformers 9 and 10 to respective reproducing amplifiers 44 and 45, whose outputs are combined in a mixer 49, whose output is in turn coupled to a demodulator 54 for demodulation if the recorded signal is frequency modulated. Thus, the reproduced video signal is obtained from a terminal 56 for picture reproduction on a monitor television receiver connected to the terminal 56.

In the meantime, there may arise the necessity of correcting some portion of the record in such case as when it is desired to substitute a new content for a certain one of the fields successively recorded on the tape in the above manner or when a video signal which is not to be recorded is erroneously recorded. In such cases, the record portion to be removed has to be found and replaced with a new record field by field. For removing a field and replacing it with a new field it is necessary to bring the relevant field portion to the neighborhood of the drum periphery between the points (I) and (II). The method of realizing this will now be described.

If it is desired to correct the field F in FIG. 2, successive fields are progressively reproduced from field A by driving the tape 1 passed around the drum 3 shown in FIG. 1 with the capstan 28 and pinch roller 29 similar to the drive at the time of recording. At this time, the video signal to be recorded on the portion of the field F is coupled to the terminal 55, whereby the aforementioned signals $e$ and $f$ in FIG. 4 are obtained from the ½ frequency divider 50. Also, the motor 11 is phase controlled according to these signals and the signal representing the rotational phase of the stationary magnetic head 13 as obtained from the delay circuit 35. When the motor 11 is controlled in this way, reproduced signals are obtained from the rotary magnetic heads 5 and 6. These reproduced signals are coupled through the rotary transformers 9 and 10 to the amplifiers 44 and 45. At this time, the movable contact of the switch 81 is held thrown to the P side. The output signals of the amplifiers 44 and 45 are coupled to and combined in the mixer 49, whose output is in turn coupled to the demodulator 54 for demodulation. Meanwhile since the tape 1 is wound on the periphery of the drum 3 subtending more than 180°, the reproduced signals from the rotary magnetic heads 5 and 6 partly overlap each other timewise. Therefore, in the overlapping part a beat signal appears, which results in disturbance of the reproduced video for that portion. To solve this problem, gate circuits are incorporated in the amplifiers 44 and 45, and signals $e$ and $f$ in FIG. 4 obtained from the ½ frequency divider 50 are used as gating signals. By doing so, only the signals reproduced from the records from tape portions on the drum periphery between the points (I) and (II) are combined, so that video signal free from beat interference can be reproduced. The reproduced video signal obtained from the demodulator 54 can be monitored as reproduced picture on a monitor television receiver (not shown) connected to the terminal 56.

Now, if there are two fields of different contents recorded on the tape portion of the drum periphery between the points (I) and (II), two picture vertically separate portions can be reproduced on the picture tube screen of the monitor television receiver. As the tape is driven, the juncture between these two pictures rolls upwardly. While the picture reproduction on the monitor television receiver is being watched, at a certain instant the signal of the whole field F will appear on the picture tube screen. If the tape 1 is stopped at this instant, the tape portion where the field F is recorded will be found between the points (I) and (II) of the drum as shown in FIG. 3. A method of control for bringing the record of the field F onto the drum periphery between the points (I) and (II) in this way will now be discussed.

Figure 13:
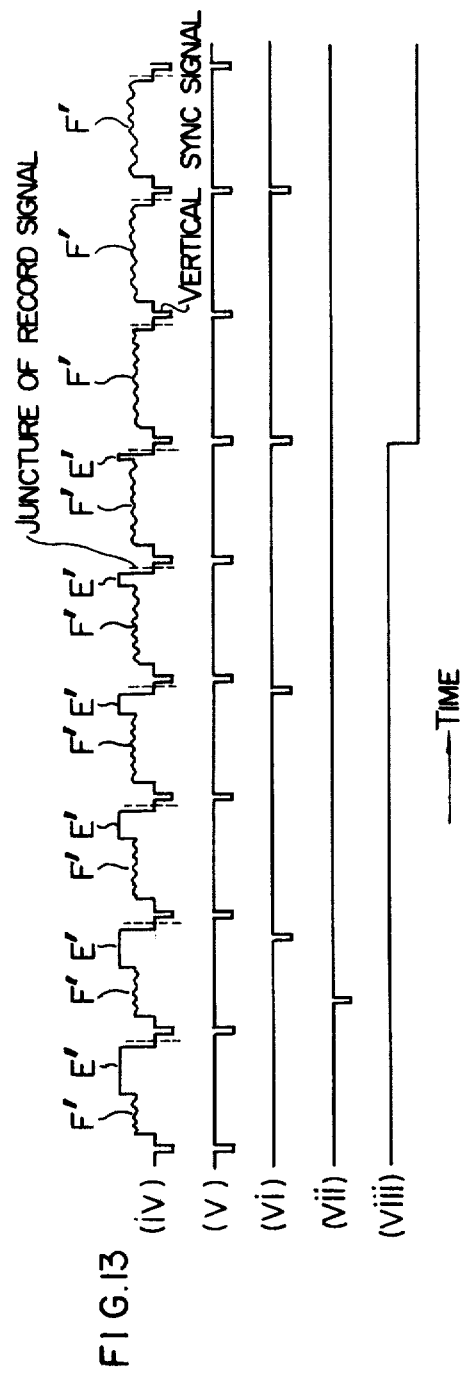
FIG. 13 is a waveform chart showing signals appearing at certain parts of the system of FIG. 1.

The tape drive is started; that is, the plungers 17 and 27 are activated, by applying a tape drive start command signal (obtained through manual operation as mentioned earlier) to an input terminal 57a of a tape feed control circuit 38. Then, as soon as the picture of the field F begins to appear on the monitor television receiver, a tape stop command signal is given to the input terminal 57b of the tape feed control circuit 38. To the tape feed control circuit 38 a signal from a vertical sync signal separator circuit 39 receiving the output of the demodulator 54; that is, the vertical sync signal in the reproduced signal, is also coupled. Further, an output signal of a delay circuit 37 delaying by a predetermined delay period the signal representing the rotational phase of the rotary magnetic heads is coupled to the tape feed control circuit 38. The tape feed control circuit 38 stops the tape, that is, cuts current off the plungers 17 and 27, at an instant when the phases of the afore-mentioned two signals come to coincidence with each other. This process will be discussed in further detail. A signal shown at (iv) in FIG. 13 is the reproduced video signal obtained from the demodulator 54. With this signal, fields E and F are reproduced on the monitor television receiver; the reproduced signals of the fields E and F are indicated at E' and F' in the reproduced signal (iv) in FIG. 13 respectively. As this signal is supplied to the vertical sync signal separator circuit 39, a signal shown at (v) in FIG. 13 is obtained. Meanwhile, a rotational phase signal as shown at (vi) in FIG. 13 is obtained from the delay circuit 37. A tape stop command signal as shown at (vii) in FIG. 13 is applied to the input terminal 57b of the tape feed control circuit 38 while the field F is partly displayed on the picture tube screen. Although the tape is not stopped upon impression of this signal, it is stopped at the instant when the phases of the afore-mentioned two signals, that is, vertical sync signal and rotational phase signal, come to coincide with each other. Through this control of the drive current (shown at (viii) in FIG. 13) supplied to the plungers 17 and 27, the tape portion of the record of the field F can be brought to the drum periphery portion between the points (I) and (II).

While the desired video signals is recorded on the relevant tape portion brought to the drum periphery portion between the points (I) and (II), the tape might not be stopped exactly at the instant of phase coincidence of the afore-mentioned two signals but undergo an overshoot due to possible play involved in the tape stop mechanism as mentioned earlier. The overshoot is not indicated in the waveforms of FIG. 13 since it is very small. With such an overshoot, the desired video signal of one field would be recorded on a tape portion deviated from the portion of the field F so long as it is recorded on the drum periphery portion between the points (I) and (II) under the control of the rotational phase signal from the stationary magnetic head representing the situation where the field F is perfectly present on the drum periphery portion between the points (I) and (II) and the signal $f$ in FIG. 4 (output of the ½ frequency divider 50) produced from the input video signal. Accordingly, the motor 11 is controlled according to the vertical sync signal in the reproduced video signal and that in the video signal to be recorded. By so doing, the new signal can be recorded exactly on the tape portion of the field F. In practice, the control is of course made according to the signal obtained by frequency dividing the vertical sync signals to ½.

Meanwhile, if a signal is recorded on a tape portion where a different signal is previously recorded, the double or overlap record results. When recording a frequency modulated wave, however, by increasing the level of the recording current of the newly recorded signal compared to the current when the previous field F is recorded, the previous record of the field F will be erased to leave only the record of the new signal. Thus, in this case it is hardly necessary to preliminarily erase the previous record, and the new video signal can be recorded perfectly on the tape portion of the previously recorded field F. However, in the recent magnetic recording systems where the color signal is frequency converted to a low frequency band for recording, the previous color signal record is not completely erased but more or less remains at the time of double recording. Therefore, the previous record has to be preliminarily erased in this case. To this end, that is, to erase the field F for instance, erasing current with a duration of 1 V is caused instead or recording current while effecting the phase control according to the vertical sync signal in the reproduced video signal and that in the input video signal. When the erasing is ended, the afore-mentioned vertical sync signal vanishes since the reproduced video signal is no longer obtained. From this instant, the signal representing the trailing end of the preceding field E, i.e., the output signal of the pulse generator 46, is used for the phase control similar to the case of recording the preceding fields B, C, D as mentioned earlier. In this way, the new video signal can be recorded perfectly on the tape portion where the field F had been previously recorded.

Figure 14:
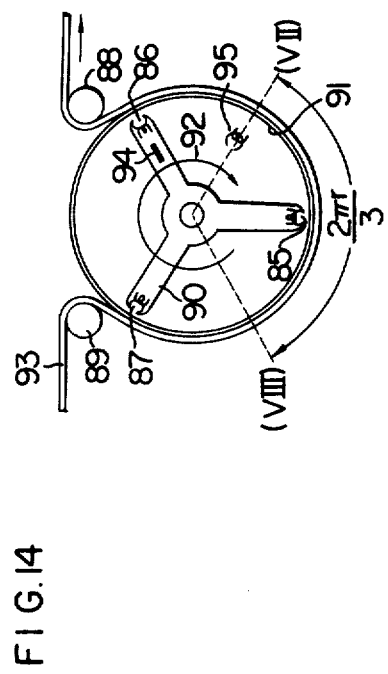
FIG. 14 is a top view of a still another example of the rotary magnetic head assembly used for the magnetic recording system according to the invention.

While the foregoing description has been concerned with the rotary magnetic head assembly using two rotary magnetic heads, one for both recording and reproduction and the other only for reproduction, according to the invention any desired number of rotary magnetic heads for reproduction only may be used, although only a single recording/reproduction rotary magnetic head is needed. For example, it is possible to employ an arrangement using two rotary magnetic heads for reproduction only, as shown in FIG. 14. In this case, if a rotary magnetic head 85 is the recording/reproduction rotary magnetic head, the other two rotary magnetic heads 86 and 87 are used for reproduction only. In this arrangement using three rotary magnetic heads, by uniformly spacing these heads (i.e., arranging them at a uniform angular spacing of 120°) and setting the speed of rotation of rotary magnetic head bar 90 in the direction of the arrow to 1,200 rpm (or 20 rps) the period required for the rotary magnetic heads to cover one-third the periphery of drum 91 is made equal to the field period (1/60 sec.) of the Japan and U.S.A. standard television system. In this case, one field of video signal can be recorded by the recording/reproduction rotary magnetic head 85 over a drum periphery portion between points (VII) and (VIII) provided the peripheral length between the points (VII) and (VIII) is ⅓ × 2 $\pi r$ ($r$ being the radius of the drum 91). In other words, one field corresponds to just one half of the drum periphery when two rotary magnetic heads are used. In the case of the three head arrangement one field corresponds to one-third of the drum periphery. Here, the recording tape may be fed for one field in a manner similar to that used for the two head arrangement; that is, by stopping the tape at the instant of phase coincidence of the reproduced signal from either reproducing head 86 or 87 and the output signal of stationary magnetic head 95 representing the phase of the drum (i.e., pulse signal produced when magnet 94 clears the underside of the stationary magnetic head 95).

Further, a continuous record of successive fields one continuous to the next one may be obtained in a manner similar to the case of the two head arrangement. In the three head assembly, however, the fact that odd and even fields alternately appear over the same drum portion between the points (VII) and (VIII); that is, like fields appear for every two rotations of the drum, has to be borne in mind. Accordingly, a method of extracting one field for recording will now be mentioned.

In this case, a ⅓ frequency divider is incorporated in the shaping circuit 75 in the gating signal generator 43 shown in FIG. 8, whereby a pulse signal of a pulse repetition period corresponding to 6 fields (a signal obtained by frequency dividing the signal $k$ in FIG. 4 to ⅓) is coupled from the shaping circuit 75 to the NAND circuit 77. As a consequence, a gating signal capable of gating only like fields; that is, only even or odd fields, can be obtained from the gating signal generator 43. By gating the frequency modulated video signal from the modulator 42a in the gating circuit 42b under the control of this gating signal, the gated signal may be recorded by the rotary magnetic head 85 over the afore-mentioned drum periphery between the points (VII) and (VIII).

In the meantime, for controlling the drum motor by using the video signals reproduced by the reproducing magnetic heads the output of either one of the two rotary magnetic heads for reproduction only may be used in the case of the three head arrangement as mentioned earlier. For example, in the arrangement of FIG. 14 the drum motor may be controlled by using a signal obtained from a pulse generator (corresponding to the pulse generator 46 in FIG. 1) receiving the output of an amplifier (corresponding to the amplifier 45 in FIG. 1) amplifying the output of, for instance, the reproduction rotary magnetic head 86 and a signal obtained by frequency dividing the vertical sync signal in the input video signal to ⅓; i.e., signal at 20 Hz. By so doing, a continuous video signal track can be recorded on the tape.

Next, the consistency of the horizontal sync signal phase free from any shift at the juncture between adjacent recorded fields may be obtained by the methods mentioned earlier. More particularly, it is possible to use the method of alternately recording even and odd fields with the arrangement where the three rotary magnetic heads are uniformly spaced (corresponding to the 180-degree arrangement of two heads) and also the method of controlling the recording length. Further, it is possible to use the method employing head arrangement where the individual heads are suitably shifted from the positions of uniform spacing. As an example, the angular spacing between recording/reproduction rotary magnetic head 85 and reproduction rotary magnetic head 86 is set to (120° − 13′ 40″), the spacing between the head 86 and the other reproduction rotary magnetic head 87 to (120°+ 13′ 40″), and the spacing between the head 87 and the recording/reproduction rotary magnetic head 85° to 120°. In general, if $\theta_1$ is the angular spacing between recording/rotary magnetic head 85 and reproduction rotary magnetic head 86, $\theta_2$ is the spacing between the head 86 and the other reproduction rotary magnetic head 87 and $\theta_3$ is the spacing between the head 87 and the recording rotary magnetic head 85 and if $n_1$, $n_2$ and $n_3$ are determined so as to satisfy the relations $$\frac{\theta_1}{\theta_s} = n_1, \frac{\theta_2}{\theta_s} = n_2 \text{ and } \frac{\theta_3}{\theta_s} = n_3$$

where $$\theta_s = \frac{360°}{1575} = 0.228° = 13'46'' \ (1575 = 525 \times 3)$$

and $n_1$, $n_2$ and $n_3$ are positive integers, the spacing between the respective heads may be determined so as to satisfy the following relation:

$$n_1 + n_2 + n_3 = 1575$$

In the above way, the rotary magnetic head arrangements using two heads can be replaced with corresponding arrangements of three heads or four or more heads for similar recording. In case of using three or more rotary magnetic heads, unlike the case of using two rotary magnetic heads, it is possible to reproduce only a certain field continuously while the tape is driven in playback. For example, in the case of using three heads as shown in FIG. 14 so long as the recorded portion of the tape 93 is wound around at least two-thirds of the drum periphery (i.e., for at least two fields since the spacing between adjacent heads corresponds to one field), a complete field is always found somewhere on the drum. Thus, this complete field record portion on the drum may be repeatedly reproduced by the three rotary magnetic heads even while the tape is running to obtain a still picture. Further, by the time the complete field reproduced while the tape is running begins to leave the drum the next complete field is found on the drum, so that a continued video signal of a different content can be obtained by reproducing this subsequent field.

What is claimed is:

1. In a magnetic recording system for extracting desired fields from a continuous video signal containing sync signals and recording said fields sequentially field-by-field on a magnetic tape, comprising:
    a rotary magnetic head assembly including a drum and a plurality of rotary magnetic heads;
    a motor for rotating said magnetic heads;
    rotational phase detection means for detecting the rotational phase of said rotary magnetic heads and generating a rotational phase signal corresponding thereto;
    intermittent magnetic tape drive means for intermittently moving a predetermined length of said magnetic tape around the outer periphery of said drum in a selected direction, said magnetic tape being held stationary during recording;
    video signal recording circuit means for extracting a desired field from said video signal to be recorded and coupling said field to one of said rotary magnetic heads;
    video signal reproducing means for reproducing the video signal recorded on said magnetic tape, said signal being extracted from said tape by a magnetic head other than said one head used for recording said video signal on said tape;
    pulse generating means coupled to said video signal reproducing means for generating a pulse at the instant the reproduced video signal at the output of said video signal reproducing means vanishes;
    tape drive control means having inputs coupled to said pulse generating means and said rotational phase detection means and an output coupled to said intermittent magnetic tape drive means, the output of said tape drive control means controlling said magnetic tape drive means to stop said magnetic tape when the non-recorded portion thereof arrives at a predetermined recording position on the outer periphery of said drum; and
    magnetic head motor control means having inputs coupled to said pulse generating means and said rotational phase detection means and an output coupled to said motor for rotating said magnetic heads; said motor control means coupling a phase error signal to said motor for controlling the rotation of said motor.

2. The magnetic recording system defined by claim 1, wherein said magnetic head motor control means comprises:
    a gate circuit having inputs coupled to the outputs of said pulse generating means and said rotational pulse detection means;
    a ramp wave generator; and
    a phase comparator having inputs coupled to the outputs of said gate circuit and ramp wave generator and an output coupled to said motor for rotating said magnetic heads, said phase comparator comparing the phase of the outputs of said gate circuit and said ramp wave generator to produce said phase error signal for controlling the rotation of said motor;
    said gate circuit transmitting the output pulse from said pulse generating means to said phase comparator when said pulse generating means produces a pulse, and said gate circuit transmitting said rotational phase signal to said phase comparator when said pulse generating means does not produce a pulse;
    said pulse comparator sampling and holding the inclined portion of the ramp wave of the output of said ramp wave generator under the control of the output pulse from said pulse generating means thereby obtaining said phase error signal.

3. The magnetic recording system in accordance with claim 1, wherein said motor control means further includes:
    a switching circuit connected between the output terminal of said gate circuit and one input terminal of said phase comparator; and
    a pulse circuit to produce pulses in substantially the same phase as that of pulses obtained from said pulse generating means before recording;
    said switching circuit functioning to supply the pulse output from said pulse generating means obtained through said gate circuit to one input terminal of said phase comparator before the recording of a new video signal and supply the pulse output from said pulse circuit to said one terminal of the phase comparator after the recording.

4. The magnetic recording system in accordance with claim 3, wherein said motor control means further includes:
    means to operate said switching circuit such that the signal to be supplied to said one input terminal of said phase comparator is switched from the pulse output to said pulse circuit to that of said pulse generating means upon detection of coincidence between the phases of the pulse output of said pulse generating means and that of said pulse circuit.

5. The magnetic recording system in accordance with claim 1, wherein said intermittent magnetic tape drive means includes a tape moving mechanism having a capstan rotated at a fixed speed and a pinch roller adapted to urge the magnetic tape against said capstan at a desired instant, and a tape keeping mechanism having at least a pair of fixed plates and associated movable tape keeping members adapted to check and allow a desired movement of said magnetic tape, said tape keeping mechanism being interlocked to said pinch roller such that it holds the tape stationary when the pinch roller is not in forced contact with said capstan and allows the tape to move when the pinch roller is in forced contact with said capstan.

6. The magnetic recording system in accordance with claim 1, wherein said rotary magnetic head assembly has first and second rotary magnetic heads spaced apart by 180° from each other said rotary magnetic heads being adapted to alternately record respective odd number and even number fields of said video signal.

7. The magnetic recording system in accordance with claim 1, wherein said rotary magnetic head assembly has first and second rotary magnetic heads spaced apart from each other such as to subtend angles $\theta_A°$ and $\theta_B°$ satisfying the relations $$\theta_A/\theta_S = \alpha$$

and $$\theta_B/\theta_S = \beta$$

where $\alpha$ and $\beta$ are positive integers related to each other such that $\alpha + \beta = 525$ and $\theta_S° = 360°/525$.

8. The magnetic recording system in accordance with claim 1, wherein said rotary magnetic head assembly has first and second rotary magnetic heads spaced apart by 180° from each other, said rotary magnetic heads being used for recording a video signal on said magnetic tape in successive portions thereof, said portion having a length corresponding to a period of M × H, where H is the period of the horizontal sync signal contained in the video signal to be recorded and M is an integer close to 262.

9. The magnetic recording system in accordance with claim 1, wherein said video signal reproducing means further includes first means for reproducing the video signal recorded on said magnetic tape including said one rotary magnetic head used for recording, second means for mixing the outputs of said magnetic head other than said one head used for recording and said first means, and third means for demodulating the output of said second means, a vertical sync signal separator coupled to the output of said third means, and said tape drive control means further comprising tape feed control circuit means having an input coupled to the output of said rotational phase detection means and another input coupled to the output of said vertical sync signal separator, the output of said tape feed control circuit means being coupled to said intermittent magnetic tape drive means for stopping the movement of said magnetic tape when a non-recorded portion of said magnetic tape following a previously recorded portion arrives at a recording position on said drum.

* * * * *